(12) United States Patent
Akashi

(10) Patent No.: US 11,498,363 B2
(45) Date of Patent: Nov. 15, 2022

(54) PNEUMATIC TIRE

(71) Applicant: The Yokohama Rubber Co., LTD., Tokyo (JP)

(72) Inventor: Yasutaka Akashi, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 38 days.

(21) Appl. No.: 16/079,537

(22) PCT Filed: Feb. 20, 2017

(86) PCT No.: PCT/JP2017/006118
§ 371 (c)(1),
(2) Date: Aug. 23, 2018

(87) PCT Pub. No.: WO2017/145982
PCT Pub. Date: Aug. 31, 2017

(65) Prior Publication Data
US 2019/0054768 A1 Feb. 21, 2019

(30) Foreign Application Priority Data

Feb. 23, 2016 (JP) .............................. JP2016-032085

(51) Int. Cl.
*B60C 9/08* (2006.01)
*B60C 5/14* (2006.01)
(Continued)

(52) U.S. Cl.
CPC ................. *B60C 9/08* (2013.01); *B60C 5/14* (2013.01); *B60C 5/142* (2013.01); *B60C 9/04* (2013.01); *B60C 13/04* (2013.01)

(58) Field of Classification Search
CPC .................................. B60C 9/08; B60C 5/14
See application file for complete search history.

(56) References Cited

U.S. PATENT DOCUMENTS 6,123,132 A * 9/2000 Appleton ................ B60C 5/142
152/458
6,608,132 B1 8/2003 Bomo et al.
(Continued)

FOREIGN PATENT DOCUMENTS

DE    10 2008 038 764      2/2010
DE    102008038764 A1 *    2/2010 ............. B60C 5/142
(Continued)

OTHER PUBLICATIONS

International Search Report for International Application No. PCT/JP2017/006118 dated May 23, 2017, 4 pages, Japan.

*Primary Examiner* — Timothy Kennedy
*Assistant Examiner* — Farah Taufiq
(74) *Attorney, Agent, or Firm* — Thorpe North & Western

(57) ABSTRACT

Provided is a pneumatic tire. A partial tie rubber layer is selectively disposed between a carcass layer and an inner liner layer in an area on a tread portion on either side in a tire lateral direction excluding a center region of the tread portion such that a length of intrusion from a perpendicular line extending from an outermost edge of a belt layer in a tire lateral direction through the inner liner layer toward a tire equator of each of the partial tie rubber layers is within the range from 0 to 15 mm and a length of protrusion from the perpendicular line toward a bead portion of the partial tie rubber layer is within the range from 15 to 120 mm.

1 Claim, 2 Drawing Sheets

(51) Int. Cl.
    *B60C 9/04*          (2006.01)
    *B60C 13/04*         (2006.01)

(56) References Cited

U.S. PATENT DOCUMENTS

2002/0074077 A1\* 6/2002 Ikeda ..................... B60C 13/04
                                                    156/123
2006/0144495 A1   7/2006 Higuchi et al.

FOREIGN PATENT DOCUMENTS

| | | |
|---|---|---|
| EP | 0 931 676 | 7/1999 |
| EP | 0 948 573 | 2/2006 |
| EP | 1 782 968 | 5/2007 |
| JP | 09272308 A \* | 10/1997 |
| JP | H09-272308 | 10/1997 |
| JP | 2001-138708 | 5/2001 |
| JP | 2001138708 A \* | 5/2001 |
| JP | 2009-279974 | 12/2009 |
| JP | 5239507 | 7/2013 |
| JP | 5723086 | 5/2015 |
| JP | 2015-174594 | 10/2015 |
| WO | WO 97/43349 | 11/1997 |
| WO | WO 2005/007423 | 1/2005 |

\* cited by examiner

PNEUMATIC TIRE

TECHNICAL FIELD

The present technology relates to a pneumatic tire including partial tie rubber layers selectively disposed in regions in an area between a carcass layer and an inner liner layer, and particularly relates to a pneumatic tire having a reduced tire weight while maintaining air permeation preventive properties and steering stability to achieve good compatibility between these qualities.

BACKGROUND ART

In a typical pneumatic tire, a tie rubber layer is disposed between a carcass layer and an inner liner layer to prevent carcass cords from intruding into the inner liner layer when an unvulcanized tire is inflated during production. For such a tie rubber layer, it has been proposed to use partial tie rubber layers selectively disposed in regions in the entire area between the carcass layer and the inner liner layer, to reduce tire weight and rolling resistance (for example, refer to Japan Patent Nos. 5239507 and 5723086).

Such partial tie rubber layers are disposed generally in shoulder regions (the regions having a large curvature and thus prone to intrusion of the carcass cords during inflation). Many different positions of the partial tie rubber layers have been proposed with the aim of achieving an advantage equivalent to that of a known tie rubber layer disposed in the entire region between the carcass layer and the inner liner layer (full tie rubber layer) and improving specific qualities. For example, Japan Patent No. 5239507 proposes to dispose the outer edge of a partial tie rubber layer in the tire radial direction in a region extending inward from the edge of a second widest belt layer in the tire lateral direction by a length corresponding to from 10% to 40% of the width of the belt layer and to dispose the inner edge of the partial tie rubber layer in the tire radial direction in a region extending inward and outward from the position of the tire maximum width in the tire radial direction by a length corresponding to 10% of the tire cross-sectional height. Alternatively, Japan Patent No. 5723086 proposes to dispose the outer edge of a partial tie rubber layer in the tire radial direction on the inward side in the tire radial direction of a land portion (middle land portion) between the outermost circumferential groove (shoulder longitudinal groove) in the tire lateral direction and the next inner circumferential groove (middle longitudinal groove).

Even when tie rubber layers are provided in parts (when partial tie rubber layers are used) as in the propositions described above, the effect on reduction in tire weight is limited and not necessarily sufficient because the performance level equivalent to that of a known full tie rubber layer (air permeation preventive properties and steering stability on a dry road surface) has to be maintained. Thus, further improvement through optimization of the positioning of the partial tie rubber layers is required for good compatibility between air permeation preventive properties, steering stability, and reduction in tire weight.

SUMMARY

The present technology provides a pneumatic tire including partial tie rubber layers selectively disposed in regions in an area between a carcass layer and an inner liner layer, the pneumatic tire having a further reduced tire weight while maintaining air permeation preventive properties and steering stability, to achieve good compatibility between these qualities.

A pneumatic tire according to the present technology includes an annular tread portion extending in a tire circumferential direction, a pair of sidewall portions disposed on both sides of the tread portion, a pair of bead portions disposed inward of the sidewall portions in a tire radial direction, a carcass layer mounted between the pair of bead portions, a belt layer disposed on the tread portion on an outer circumferential side of the carcass layer, an inner liner layer disposed on a tire inner surface along the carcass layer, and a partial tie rubber layer selectively disposed between the carcass layer and the inner liner layer and in an area on the tread portion on either side in a tire lateral direction excluding a center region of the tread portion, wherein the partial tie rubber layer has a length of intrusion L1 from a perpendicular line P extending from an outermost edge of the belt layer in the tire lateral direction through the inner liner layer toward a tire equator of the partial tie rubber layer that is within a range from 0 mm to 15 mm and a length of protrusion L2 from the perpendicular line P toward the bead portion of the partial tie rubber layer that is within a range from 15 mm to 120 mm.

In the present technology, partial tie rubber layers are used, and the length of intrusion L1 and the length of protrusion L2 from the perpendicular line P (i.e., the outermost edge of the belt layers in the tire lateral direction) are set as described above to reduce the tire weight more than those of a known pneumatic tire including a full tie rubber layer. Thus, the partial tie rubber layers can cover a minimum area required for achieving air permeation preventive properties and steering stability at a level similar to that of a known pneumatic tire, and excellent air permeation preventive properties and steering stability can be maintained. Here, the area covered with the partial tie rubber layers in order to achieve these qualities is minimized and thus the volume of the partial tie rubber layers can be significantly reduced in comparison with a known pneumatic tire including partial tie rubber layers. Thus, the tire weight can be further reduced. In this way, good compatibility between the air permeation preventive properties, the steering stability, and the reduction in tire weight can be achieved.

According to the present technology, it is preferred that the periphery length of each of the partial tie rubber layers be within the range from 30 to 120 mm. The length of such partial tie rubber layers is optimized within an appropriate range to achieve better compatibility between the air permeation preventive properties, the steering stability, and the reduction in tire weight. In the present technology, "periphery length" is defined as the length of each tire component (partial tie rubber layer) measured on the tire meridian cross-section in the extending direction.

According to the present technology, it is preferred that the hardness of the rubber of the partial tie rubber layers be within the range from 50 to 70. This can supplement the rigidity of the sidewall portions that may decrease as the volume of the partial tie rubber layers decreases and thus is advantageous in maintaining the steering stability. In the present technology, "hardness of rubber" is defined as the hardness measured with a type A durometer in accordance with JIS (Japanese Industrial Standard) K6253 at a temperature of 20° C. (referred to as JIS-A hardness).

In the present technology, it is preferred that the thickness of the partial tie rubber layers be within the range from 0.1 to 1.0 mm. The thickness of the partial tie rubber layers is optimized within an appropriate range as described above to achieve better compatibility between the air permeation preventive properties, the steering stability, and the reduction in tire weight. In the present technology, "thickness of partial tie rubber layer" is defined as the thickness of the main portion of a partial tie rubber layer (the portion extending with a constant thickness). In the case where the partial tie rubber layer is, for example, tapered toward the edges, the thickness is defined by excluding these taped portions.

DETAILED DESCRIPTION

The configuration of embodiments of the present technology will now be described in detail with reference to the accompanying drawings.

Figure 1:
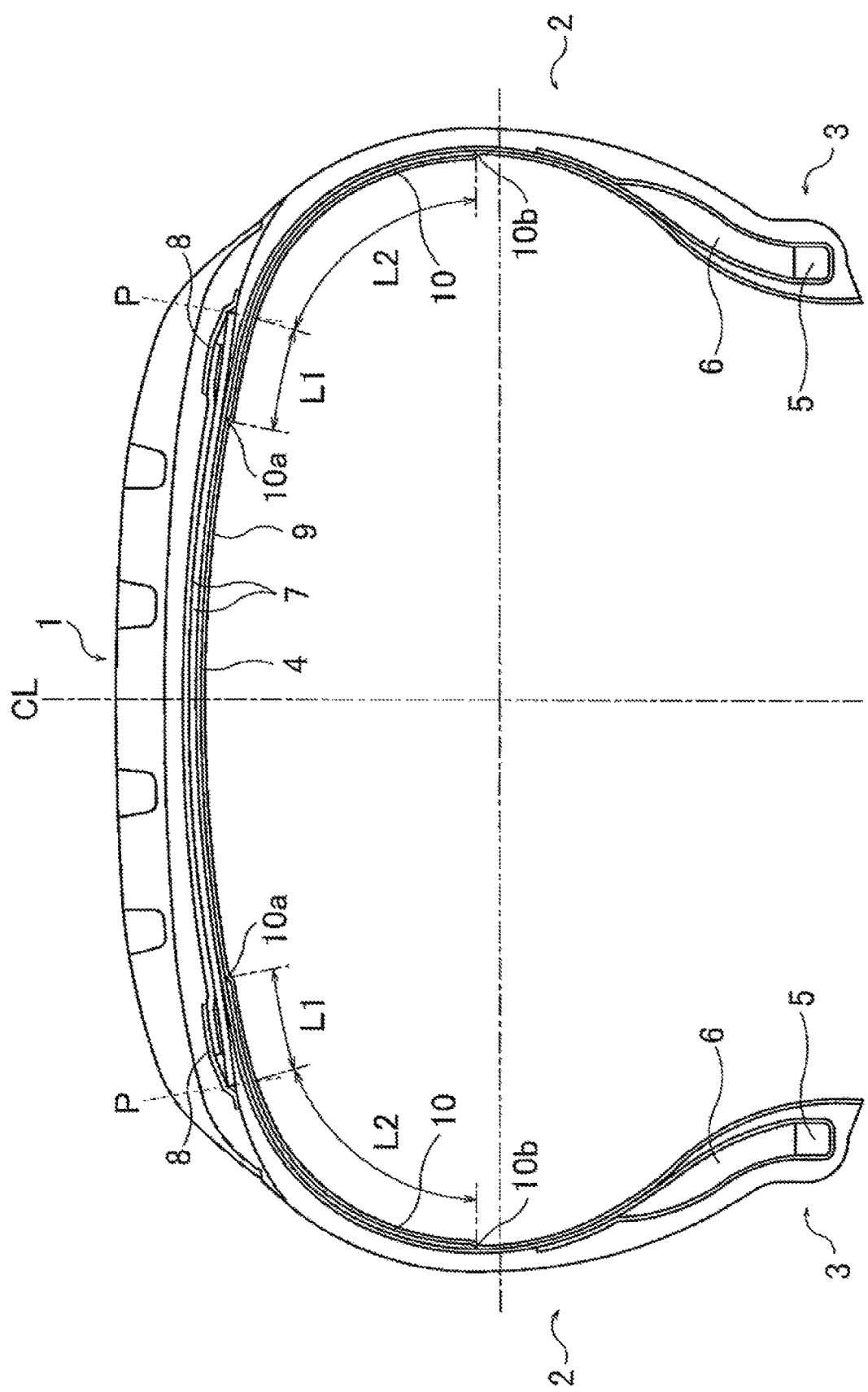
FIG. 1 is a meridian cross-sectional view of a pneumatic tire according to an embodiment of the present technology.

With reference to FIG. 1, a pneumatic tire according to an embodiment of the present technology includes an annular tread portion 1 extending in the tire circumferential direction, a pair of sidewall portions 2 disposed on both sides of the tread portion 1, and a pair of bead portions 3 disposed inward of the sidewall portions 2 in the tire radial direction. Reference sign CL in FIG. 1 denotes the tire equator.

Figure 2:
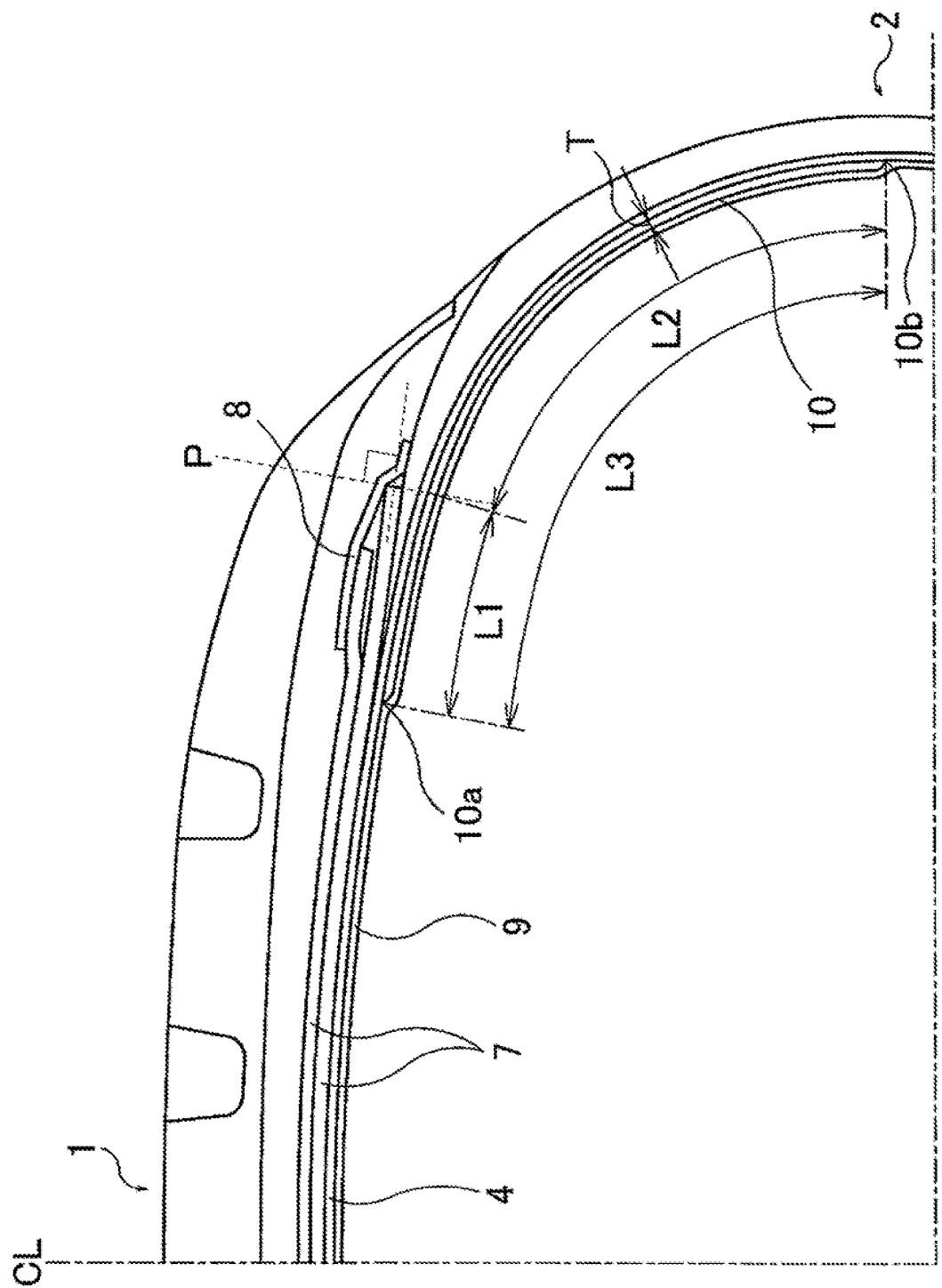
FIG. 2 is an enlarged meridian cross-sectional view of a main portion of the pneumatic tire illustrated in FIG. 1.

A carcass layer 4 is mounted between a pair of left and right bead portions 3. The carcass layer 4 includes a plurality of reinforcing cords extending in the tire radial direction and is folded back around a bead core 5 disposed in each of the bead portions 3 from a vehicle inner side to a vehicle outer side. A bead filler 6 is disposed on the periphery of the bead core 5 and is enveloped by a main portion and a folded back portion of the carcass layer 4. In the tread portion 1, a plurality of belt layers 7 (two layers in FIGS. 1 to 2) is embedded in an outer circumferential side of the carcass layer 4. The belt layers 7 each include a plurality of reinforcing cords that are inclined with respect to the tire circumferential direction, the reinforcing cords of the different layers intersecting each other. In these belt layers 7, the inclination angle of the reinforcing cords with respect to the tire circumferential direction is set in the range, for example, from 10° to 40°. Belt reinforcing layers 8 are provided on the outer circumferential sides of the belt layers 7. The belt reinforcing layers 8 include organic fiber cords oriented in the tire circumferential direction. In the belt reinforcing layers 8, the angle of the organic fiber cords with respect to the tire circumferential direction is, for example, from 0° to 5°.

An inner liner layer 9 is disposed on the inner surface of the tire. The inner liner layer 9 has a rubber composition primarily containing butyl rubber having air permeation preventive properties and prevents air filled in the tire from permeating the tire to the outside.

Partial tie rubber layers 10 are disposed between such an inner liner layer 9 and carcass layer 4. The tie rubber layers disposed between the inner liner layer 9 and the carcass layer 4 prevent the carcass cords from intruding into the inner liner layer 9 when an unvulcanized pneumatic tire is inflated during production and contribute to air permeation preventive properties and steering stability on dry road surfaces of the tire after production. Unlike a known tie rubber layer (full tie rubber layer) disposed in the entire area between the carcass layer 4 and the inner liner layer 9, the partial tie rubber layers 10 according to an embodiment of the present technology are selectively disposed in an area excluding the center region of the tread portion 1 and the bead portions 3, as described below. That is, with reference to FIG. 1, the partial tie rubber layers 10 are disposed on both sides of the tire equator CL in the tire lateral direction in an area overlapping with the shoulder regions of the tread portion 1 and the sidewall portions 2, as described below.

Specifically, the partial tie rubber layers 10 according to an embodiment of the present technology are disposed such that a length of intrusion L1 of the partial tie rubber layers 10 from a perpendicular line P extending from the outermost edge of the belt layers 7 in the tire lateral direction through the inner liner layer 9 toward the tire equator CL is within the range from 0 mm to 15 mm and a length of protrusion L2 of the partial tie rubber layers 10 from the perpendicular line P at the belt layers 7 toward the corresponding bead portion 3 is within the range from 15 mm to 120 mm. In other words, the partial tie rubber layers 10 according to an embodiment of the present technology are disposed such that the length of the partial tie rubber layer 10 between the intersection of the perpendicular line P and the partial tie rubber layer 10 and the edge 10a of the tie rubber layer 10 adjacent to the tire equator CL is within the range from 0 mm to 15 mm and the length of the partial tie rubber layer 10 between the intersection of the perpendicular line P and the partial tie rubber layer 10 and the edge 10b of the partial tie rubber layer 10 adjacent to the corresponding bead portion 3 is within the range from 15 mm to 120 mm.

The inventors have conducted diligent research on the positioning of the partial tie rubber layers 10 when the partial tie rubber layers 10 are to be used. As a result, they have discovered that achieving air permeation preventive properties and steering stability at a level similar to that of a pneumatic tire including a known full tie rubber layer requires each partial tie rubber layer 10 to cover at least a specific region near the outmost edge of the belt layers 7 in the tire lateral direction (a region having a length of 15 mm along the partial tie rubber layer 10 from the perpendicular line P toward the corresponding bead portion 3). An increase in the area covered by the partial tie rubber layers 10 (an increase in the length of intrusion L1 and the length of protrusion L2) enhances the air permeation preventive properties and the steering stability. However, when the length of intrusion L1 and the length of protrusion L2 exceed certain values, these qualities cannot be further enhanced, and the effect on the reduction in tire weight through the use of the partial tie rubber layers 10 is limited.

Therefore, in the present technology, partial tie rubber layers are used, and the length of intrusion L1 and the length of protrusion L2 from the perpendicular line P (i.e., the outermost edge of the belt layers in the tire lateral direction) are set as described above to reduce tire weight more than those of a known pneumatic tire including a full tie rubber layer. As a result, the partial tie rubber layers cover a minimum area required for achieving air permeation preventive properties and steering stability at a level similar to that of a known pneumatic tire and can maintain excellent air permeation preventive properties and steering stability similar to those in the related art. The area covered with the partial tie rubber layers to achieve such qualities is not increased more than required and thus the volume of the partial tie rubber layers can be minimized. Thus, the tire weight can be further reduced in comparison to that of a known pneumatic tire including partial tie rubber layers. In this way, good compatibility between the air permeation preventive properties, the steering stability, and the reduction in tire weight can be achieved.

Here, when the length of intrusion L1 is less than 0 mm, the partial tie rubber layers 10 cannot cover the area defined above, and thus, the air permeation preventive properties and the steering stability cannot be satisfactorily maintained. When the length of intrusion L1 exceeds 15 mm, the air permeation preventive properties and the steering stability cannot be further enhanced, and the effect on the reduction of tire weight is limited. When the length of protrusion L2 is less than 15 mm, the area defined above cannot be covered, and thus, the air permeation preventive properties and the steering stability cannot be satisfactorily maintained. When the length of protrusion L2 exceeds 120 mm, the air permeation preventive properties and the steering stability cannot be further enhanced, and the effect on the reduction of tire weight is limited.

Higher compatibility between the reduction in tire weight and the maintenance of air permeation preventive properties and steering stability can be achieved at a length of intrusion L1 of from 5 mm to 10 mm and a length of protrusion L2 of from 30 mm to 100 mm. In this way, the partial tie rubber layers 10 cover a sufficient area including the minimum area defined above to be covered by the partial tie rubber layers 10. This is advantageous in maintaining high air permeation preventive properties and steering stability This also appropriately suppresses the volume of the partial tie rubber layers 10 and thus is advantageous for the reduction of tire weight.

In the present technology, it is preferred that the partial tie rubber layers 10 be disposed at the positions described above and also that the periphery length L3 of each partial tie rubber layer 10 be within the range from 30 mm to 120 mm, and more preferably from 40 mm to 80 mm. In this way, the partial tie rubber layer 10 has an appropriate periphery length L3 required and sufficient for covering the area defined above (being disposed at the position described above), and thus, the partial tie rubber layer 10 can have an optimal length (size, volume). As a result, higher compatibility between the maintenance of the air permeation preventive properties and the steering stability and the reduction in tire weight can be achieved. Here, when the periphery length L3 of the partial tie rubber layer 10 is less than 30 mm, the area defined above cannot be readily covered with the partial tie rubber layer 10, and thus it is difficult to maintain high air permeation preventive properties and steering stability. When the periphery length L3 of the partial tie rubber layer 10 is greater than 120 mm, the volume of the partial tie rubber layer 10 increases, and thus the effect on the reduction of tire weight is limited.

The rubber composition of the partial tie rubber layers 10 may be any rubber composition of a known tie rubber layer (a known full or partial tie rubber layer). It is preferred that the rubber composition have a rubber hardness within the range from 50 to 70, and more preferably from 55 to 65. The partial tie rubber layers 10 having a rubber composition of an appropriate hardness can compensate for a reduction in rigidity of the sidewall portions 2 that might be caused by suppressing the volume of the partial tie rubber layers 10 and, thus, is advantageous for maintaining the steering stability. At this time, when the hardness of the partial tie rubber layers 10 is less than 50, the effect on supplementing the rigidity of the sidewall portions 2 is limited, and thus, it is difficult to maintain high steering stability. When the hardness of the partial tie rubber layers 10 is greater than 70, the rigidity of the sidewall portions 2 may become excessively high, and thus, the original qualities of the pneumatic tire may be adversely affected.

The partial tie rubber layers 10 should have a sufficient thickness in order to satisfactorily function as tie rubber layers (to prevent intrusion of the carcass cords into the inner liner layer 9 during tire production). At the same time, it is preferred that the volume of the partial tie rubber layers 10 be reduced to reduce the tire weight. Thus, in the present technology, it is preferred that the thickness T of the partial tie rubber layers 10 be within the range from 0.1 mm to 1.0 mm, and more preferably from 0.3 mm to 0.7 mm. In this way, the partial tie rubber layers 10 function as satisfactory tie rubber layers and maintain satisfactory air permeation preventive properties and steering stability while having a sufficient effect on the reduction of the tire weight. When the thickness T of the partial tie rubber layers 10 is less than 0.1 mm, the partial tie rubber layers are too thin. Thus, the partial tie rubber layers 10 cannot satisfactorily function as tie rubber layers and have a limited effect on prevention of intrusion of the carcass cords into the inner liner layer 9 during tire production. As a result, it is difficult to maintain satisfactory air permeation preventive properties and steering stability. When the thickness T of the partial tie rubber layers 10 is greater than 1.0 mm, the partial tie rubber layers 10 are too thick, causing an increase in the volume and limiting the effect on the reduction of tire weight.

Examples

Fifty six types of pneumatic tires according to Conventional Example 1, Comparative Examples 1 to 11, and Examples 1 to 44 were manufactured to have a tire size of 195/65R15, a basic structure illustrated in FIG. 1, and a structure of a tie rubber layer, a length of intrusion L1 from a perpendicular line P extending from the outermost edge of belt layers in the tire lateral direction through an inner liner layer toward a tire equator of each partial tie rubber layer, a length of protrusion L2 from the perpendicular line P of the belt layers toward a bead portion of the partial tie rubber layer, a periphery length L3 of the partial tie rubber layer, a hardness of the rubber composition of the partial tie rubber layer, and a rubber thickness T of the partial tie rubber layer as specified in Tables 1 to 5.

In the "Structure of tie rubber layer" fields in Tables 1 to 5, a full tie rubber layer is indicated as "full" and a partial tie rubber layer is indicated as "partial". In the "Length of intrusion L1" fields in Tables 1 to 5, a negative value indicates that the partial tie rubber layer does not extend past the perpendicular line P into the tire equator side, and the value (absolute value) indicates the length of the partial tie rubber layer between the intersection of the perpendicular line P and the partial tie rubber layer and the edge of the partial tie rubber layer adjacent to the tire equator. In the "Length of protrusion L2" fields in Tables 1 to 5, a negative value indicates that the partial tie rubber layer does not extend past the perpendicular line P into the bead portion side, and the value (absolute value) indicates the length of the partial tie rubber layer between the intersection of the perpendicular line P and the partial tie rubber layer and the edge of the partial tie rubber layer adjacent to the bead portion.

These 56 types of pneumatic tires were evaluated for the volume of tie rubber, the air permeation preventive properties, and the steering stability (steering stability) on dry road surfaces by the evaluation methods described below, and the results are also shown in Tables 1 to 5.

Volume of Tie Rubber

The volume of tie rubber was measured in the respective test tires. Evaluation results are expressed as index values with the measured value of Conventional Example 1 being assigned the index value of 100. Smaller index values indicate a smaller volume of tie rubber and thus a reduced tire weight. An index value of "80" or less indicates a sufficiently small volume of tie rubber. That is, a satisfactory effect on the reduction of tire weight is achieved. In contrast, an index value of greater than "80" indicates an insufficient reduction in the volume of tie rubber. That is, a satisfactory effect on the reduction of tire weight is not actually achieved. An index value of "50" or less indicates an excellent effect on the reduction of tire weight.

Air Permeation Preventive Properties

The test tires were assembled on wheels having a rim size of 15×6J, inflated to an air pressure of 230 kPa, and left at room temperature in a chamber for 720 hours. The rate of air permeation was calculated based on the air pressures at the beginning of placement in a chamber and after 720 hours (after placement in a chamber), and corrected room temperature. Evaluation results are expressed as index values with the reciprocal of the calculated value of Conventional Example 1 being assigned the index value of 100. A larger index value indicates a low rate of air permeation and excellent air permeation preventive properties. An index value of "90" or greater indicates that sufficient air permeation preventive properties are maintained at a level similar to that of the related art. An index value of "95" or greater indicates that the air permeation preventive properties are sufficiently high and are effectively maintained.

Steering Stability Performance

The test tires were assembled on wheels having a rim size of 15×6J, inflated to an air pressure of 210 kPa, mounted on a test vehicle having an engine displacement of 1.5 L, and subjected to a sensory evaluation by test drivers on a test course with a dry road surface. Evaluation results are expressed as index values with Conventional Example 1 being assigned an index value of 100. A larger index value indicates superior steering stability. An index value of "90" or greater indicates that sufficient steering stability is maintained at a level similar to that of the related art. An index value of "95" or greater indicates that the steering stability is sufficiently high and is effectively maintained.

TABLE 1

| | | Conventional Example 1 | Comparative Example 1 | Comparative Example 2 | Example 1 | Example 2 | Example 3 |
|---|---|---|---|---|---|---|---|
| Structure of tie rubber layer | | Full | Partial | Partial | Partial | Partial | Partial |
| Length of intrusion L1 | mm | 60 | 0 | 0 | 0 | 0 | 0 |
| Length of protrusion L2 | mm | 150 | 5 | 10 | 15 | 30 | 40 |
| Periphery length L3 | mm | 210 | 5 | 10 | 15 | 30 | 40 |
| Hardness | | 60 | 60 | 60 | 60 | 60 | 60 |
| Rubber thickness | mm | 0.5 | 0.5 | 0.5 | 0.5 | 0.5 | 0.5 |
| Volume of tie rubber | Index value | 100 | 3 | 6 | 9 | 19 | 25 |
| Air permeation preventive properties | Index value | 100 | 80 | 85 | 90 | 92 | 95 |
| Steering stability | Index value | 100 | 85 | 87 | 90 | 92 | 95 |

| | | Example 4 | Example 5 | Example 6 | Example 7 | Comparative Example 3 | Comparative Example 4 |
|---|---|---|---|---|---|---|---|
| Structure of tie rubber layer | | Partial | Partial | Partial | Partial | Partial | Partial |
| Length of intrusion L1 | mm | 0 | 0 | 0 | 0 | 0 | 0 |
| Length of protrusion L2 | mm | 60 | 80 | 100 | 120 | 130 | 140 |
| Periphery length L3 | mm | 60 | 80 | 100 | 120 | 130 | 140 |
| Hardness | | 60 | 60 | 60 | 60 | 60 | 60 |
| Rubber thickness | mm | 0.5 | 0.5 | 0.5 | 0.5 | 0.5 | 0.5 |
| Volume of tie rubber | Index value | 38 | 50 | 63 | 75 | 81 | 88 |
| Air permeation preventive properties | Index value | 96 | 97 | 98 | 99 | 100 | 100 |
| Steering stability | Index value | 96 | 97 | 98 | 99 | 100 | 100 |

TABLE 2

|  |  | Comparative Example 5 | Comparative Example 6 | Comparative Example 7 | Example 8 | Example 9 |
| --- | --- | --- | --- | --- | --- | --- |
| Structure of tie rubber layer |  | Partial | Partial | Partial | Partial | Partial |
| Length of intrusion L1 | mm | 5 | 5 | 5 | 5 | 5 |
| Length of protrusion L2 | mm | 0 | 5 | 10 | 25 | 35 |
| Periphery length L3 | mm | 5 | 10 | 15 | 30 | 40 |
| Hardness |  | 60 | 60 | 60 | 60 | 60 |
| Rubber thickness | mm | 0.5 | 0.5 | 0.5 | 0.5 | 0.5 |
| Volume of tie rubber | Index value | 3 | 6 | 9 | 19 | 25 |
| Air permeation preventive properties | Index value | 77 | 81 | 85 | 92 | 95 |
| Steering stability | Index value | 84 | 86 | 88 | 92 | 95 |

|  |  | Example 10 | Example 11 | Example 12 | Comparative Example 13 | Comparative Example 8 | Comparative Example 9 |
| --- | --- | --- | --- | --- | --- | --- | --- |
| Structure of tie rubber layer |  | Partial | Partial | Partial | Partial | Partial | Partial |
| Length of intrusion L1 | mm | 5 | 5 | 5 | 5 | 5 | 5 |
| Length of protrusion L2 | mm | 55 | 75 | 95 | 115 | 125 | 135 |
| Periphery length L3 | mm | 60 | 80 | 100 | 120 | 130 | 140 |
| Hardness |  | 60 | 60 | 60 | 60 | 60 | 60 |
| Rubber thickness | mm | 0.5 | 0.5 | 0.5 | 0.5 | 0.5 | 0.5 |
| Volume of tie rubber | Index value | 38 | 50 | 63 | 75 | 81 | 88 |
| Air permeation preventive properties | Index value | 96 | 97 | 98 | 99 | 100 | 100 |
| Steering stability | Index value | 96 | 97 | 98 | 99 | 100 | 100 |

TABLE 3

|  |  | Example 14 | Example 15 | Example 16 | Example 17 | Example 18 | Example 19 |
| --- | --- | --- | --- | --- | --- | --- | --- |
| Structure of tie rubber layer |  | Partial | Partial | Partial | Partial | Partial | Partial |
| Length of intrusion L1 | mm | 10 | 10 | 10 | 10 | 10 | 10 |
| Length of protrusion L2 | mm | 20 | 30 | 50 | 70 | 90 | 110 |
| Periphery length L3 | mm | 30 | 40 | 60 | 80 | 100 | 120 |
| Hardness |  | 60 | 60 | 60 | 60 | 60 | 60 |
| Rubber thickness | mm | 0.5 | 0.5 | 0.5 | 0.5 | 0.5 | 0.5 |
| Volume of tie rubber | Index value | 19 | 25 | 38 | 50 | 63 | 75 |
| Air permeation preventive properties | Index value | 92 | 95 | 96 | 97 | 98 | 99 |
| Steering stability | Index value | 92 | 95 | 96 | 97 | 98 | 99 |

|  |  | Example 20 | Example 21 | Example 22 | Example 23 | Example 24 | Example 25 |
| --- | --- | --- | --- | --- | --- | --- | --- |
| Structure of tie rubber layer |  | Partial | Partial | Partial | Partial | Partial | Partial |
| Length of intrusion L1 | mm | 15 | 15 | 15 | 15 | 15 | 15 |
| Length of protrusion L2 | mm | 15 | 25 | 45 | 65 | 85 | 105 |
| Periphery length L3 | mm | 30 | 40 | 60 | 80 | 100 | 120 |
| Hardness |  | 60 | 60 | 60 | 60 | 60 | 60 |
| Rubber thickness | mm | 0.5 | 0.5 | 0.5 | 0.5 | 0.5 | 0.5 |

TABLE 3-continued

| | | | | | | | |
|---|---|---|---|---|---|---|---|
| Volume of tie rubber | Index value | 19 | 25 | 38 | 50 | 63 | 75 |
| Air permeation preventive properties | Index value | 92 | 95 | 96 | 97 | 98 | 99 |
| Steering stability | Index value | 92 | 95 | 96 | 97 | 98 | 99 |

TABLE 4

| | | Comparative Example 10 | Example 26 | Example 27 | Example 28 | Comparative Example 11 |
|---|---|---|---|---|---|---|
| Structure of tie rubber layer | | Partial | Partial | Partial | Partial | Partial |
| Length of intrusion L1 | mm | −5 | 5 | 10 | 15 | 30 |
| Length of protrusion L2 | mm | 100 | 100 | 100 | 100 | 100 |
| Periphery length L3 | mm | 95 | 105 | 110 | 115 | 130 |
| Hardness | | 60 | 60 | 60 | 60 | 60 |
| Rubber thickness | mm | 0.5 | 0.5 | 0.5 | 0.5 | 0.5 |
| Volume of tie rubber | Index value | 59 | 66 | 69 | 72 | 81 |
| Air permeation preventive properties | Index value | 88 | 98 | 99 | 99 | 100 |
| Steering stability | Index value | 96 | 98 | 99 | 99 | 100 |

| | | Example 29 | Example 30 | Example 31 | Example 32 | Example 33 | Example 34 |
|---|---|---|---|---|---|---|---|
| Structure of tie rubber layer | | Partial | Partial | Partial | Partial | Partial | Partial |
| Length of intrusion L1 | mm | 2 | 4 | 6 | 8 | 10 | 12 |
| Length of protrusion L2 | mm | 30 | 45 | 60 | 75 | 90 | 105 |
| Periphery length L3 | mm | 32 | 49 | 66 | 83 | 100 | 117 |
| Hardness | | 60 | 60 | 60 | 60 | 60 | 60 |
| Rubber thickness | mm | 0.5 | 0.5 | 0.5 | 0.5 | 0.5 | 0.5 |
| Volume of tie rubber | Index value | 20 | 31 | 41 | 52 | 63 | 73 |
| Air permeation preventive properties | Index value | 93 | 95 | 97 | 98 | 99 | 100 |
| Steering stability | Index value | 93 | 95 | 97 | 98 | 99 | 100 |

TABLE 5

| | | Example 35 | Example 36 | Example 37 | Example 38 | Example 39 |
|---|---|---|---|---|---|---|
| Structure of tie rubber layer | | Partial | Partial | Partial | Partial | Partial |
| Length of intrusion L1 | mm | 7 | 7 | 7 | 7 | 7 |
| Length of protrusion L2 | mm | 53 | 53 | 53 | 53 | 53 |
| Periphery length L3 | mm | 60 | 60 | 60 | 60 | 60 |
| Hardness | | 45 | 50 | 55 | 65 | 70 |
| Rubber thickness | mm | 0.5 | 0.5 | 0.5 | 0.5 | 0.5 |
| Volume of tie rubber | Index value | 38 | 38 | 38 | 38 | 38 |
| Air permeation preventive properties | Index value | 96 | 96 | 96 | 96 | 96 |
| Steering stability | Index value | 93 | 95 | 96 | 96 | 95 |

| | | Example 40 | Example 41 | Example 42 | Example 43 | Example 44 |
|---|---|---|---|---|---|---|
| Structure of tie rubber layer | | Partial | Partial | Partial | Partial | Partial |
| Length of intrusion L1 | mm | 7 | 7 | 7 | 7 | 7 |
| Length of protrusion L2 | mm | 53 | 53 | 53 | 53 | 53 |
| Periphery length L3 | mm | 60 | 60 | 60 | 60 | 60 |

TABLE 5-continued

| | | | | | | |
|---|---|---|---|---|---|---|
| Hardness | | 75 | 60 | 60 | 60 | 60 |
| Rubber thickness | mm | 0.5 | 0.1 | 0.3 | 0.7 | 1.0 |
| Volume of tie rubber | Index value | 38 | 8 | 23 | 53 | 75 |
| Air permeation preventive properties | Index value | 96 | 94 | 96 | 98 | 98 |
| Steering stability | Index value | 93 | 94 | 96 | 98 | 98 |

As shown in Tables 1 to 5, the tire weight decreased while the air permeation preventive properties and the steering stability were maintained in Examples 1 to 44 in comparison to Conventional Example 1. In particular, Examples 3 to 5, 9 to 11, 15 to 17, 21 to 23, 26, 27, 30, 31, 37, 38, 42, and 43 sufficiently reduced the volume of tie rubber and achieved a sufficient reduction in the tire weight while the air permeation preventive properties and the steering stability were satisfactorily maintained compared to the reduction rate of the tire weight. In other words, good compatibility was achieved between these qualities.

In Comparative Examples 1 and 2, the excessively small length of protrusion L2 hindered appropriate covering by the partial tie rubber layers and satisfactory maintenance of the air permeation preventive properties and the steering stability. In Comparative Examples 3 and 4, the excessively large length of protrusion L2 led to an excessive volume of the partial tie rubber layers and thus hindered sufficient reduction in the tire weight. Comparative Examples 5 to 9, which have a large length of intrusion L1 compared to that of Comparative Examples 1 to 4, yielded the same results. That is, in Comparative Examples 5 to 7, the excessively small length of protrusion L2 hindered appropriate covering by the partial tie rubber layers and satisfactory maintenance of the air permeation preventive properties and the steering stability. In Comparative Examples 8 and 9, the excessively large length of protrusion L2 led to an excessive volume of the partial tie rubber layers and thus hindered sufficient reduction in the tire weight.

Although omitted in Tables 1 to 5, Comparative Examples 1 to 4 and 5 to 9 having an increased length of intrusion L1 were not able to maintain sufficient air permeation preventive properties and steering stability when the length of protrusion L2 was excessively small as described above and was not able to sufficiently reduce the tire weight when the length of protrusion L2 was excessively large (this also holds for examples equivalent to Examples 14 to 19 and 20 to 25 having an excessively small or large length of protrusion L2).

Comparative Example 10 having an appropriate length of protrusion L2 but an excessively small length of intrusion L1 was not able to readily achieve appropriate covering by the partial tie rubber layers and satisfactorily maintain the air permeation preventive properties and the steering stability. In Comparative Example 11, the appropriate length of protrusion L2 and the excessively large length of intrusion L1 lead to an excessive volume of the partial tie rubber layers and thus was not able to sufficiently reduce the tire weight.

The invention claimed is:

1. A pneumatic tire comprising:
an annular tread portion extending in a tire circumferential direction;
a pair of sidewall portions disposed on both sides of the tread portion;
a pair of bead portions disposed inward of the sidewall portions in a tire radial direction;
a carcass layer mounted between the pair of bead portions;
a belt layer disposed on the tread portion on an outer circumferential side of the carcass layer;
an inner liner layer disposed on a tire inner surface along the carcass layer; and
a partial tie rubber layer selectively disposed between the carcass layer and the inner liner layer and in an area on the tread portion on either side in a tire lateral direction excluding a center region of the tread portion, wherein the partial tie rubber layer has a length of intrusion L1 from a perpendicular line P extending from an outermost edge of the belt layer in the tire lateral direction through the inner liner layer toward a tire equator of the partial tie rubber layer that is within a range from 5 mm to 10 mm and a length of protrusion L2 from the perpendicular line P toward the bead portion of the partial tie rubber layer that is within a range from 85 mm to 120 mm, and
a hardness of rubber of the partial tie rubber layer is within a range from 50 to 63.

* * * * *